Dec. 26, 1950  S. MARVIN ET AL  2,535,804
FEEDER MEANS FOR CONVEYERS
Filed Aug. 27, 1948
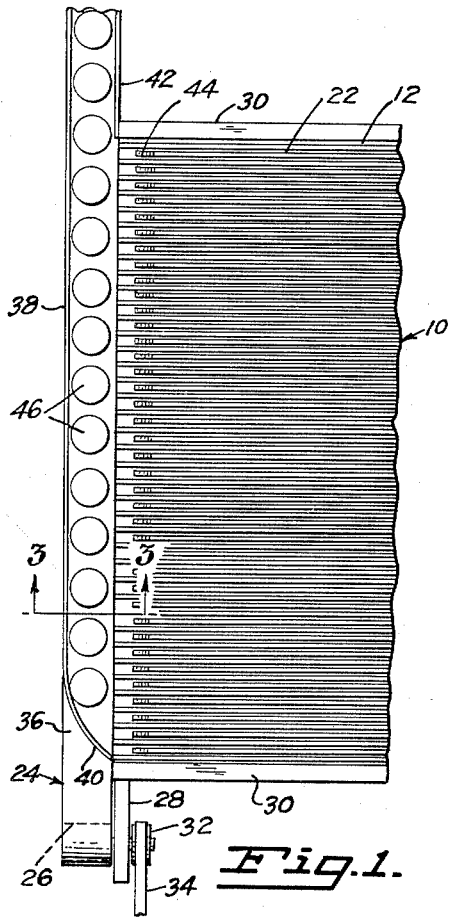
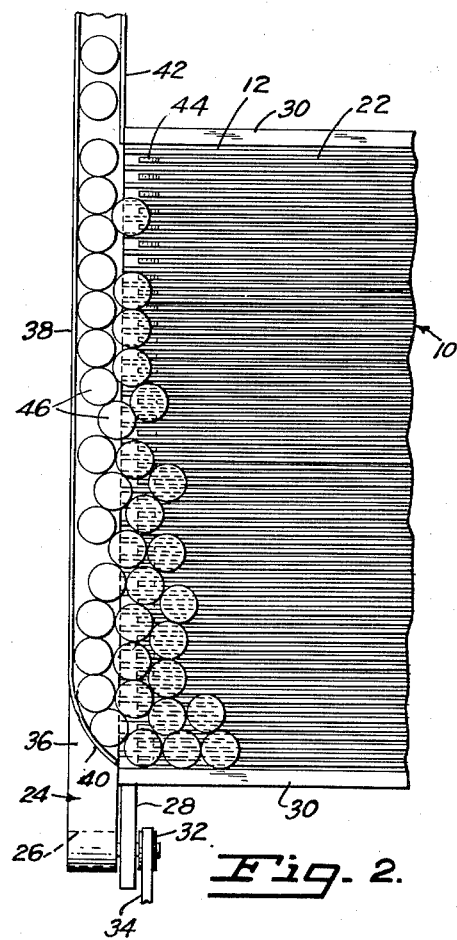
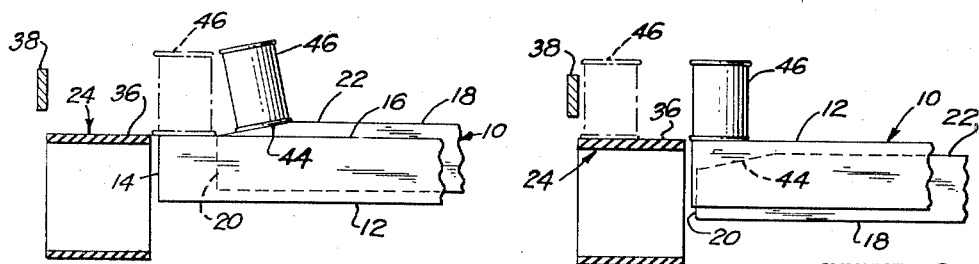
INVENTORS
WILLIAM H. ORTH
STANLEY MARVIN
BY
Naylor and Lassagne
ATTORNEYS Patented Dec. 26, 1950

2,535,804

UNITED STATES PATENT OFFICE 2,535,804

FEEDER MEANS FOR CONVEYERS

Stanley Marvin, Oakland, and William H. Orth, San Carlos, Calif.; said Orth assignor, by mesne assignments, to Peerco Corporation, San Francisco, Calif., a corporation of California, and said Marvin assignor, by mesne assignments, to Daco Metal Products, Oakland, Calif., a corporation of California Application August 27, 1948, Serial No. 46,513

4 Claims. (Cl. 198—106)

This invention relates to feeder means for conveyors, and more particularly to a feeder system for rail-type conveyors.

Rail-type conveyors comprising a plurality of fixed rails alternately arranged with respect to a plurality of movable rails, wherein the latter are actuated as a unit with a compound motion to describe a cyclic path above and forwardly and below and rearwardly of the fixed rails, are conventionally used to transport a variety of articles through such processing devices as heat treating ovens, exhaust boxes, and the like. The heat resistant characteristics of the rails together with the spacing of the rails to allow for circulation of heated air make conveyors of this type particularly suitable for use in heating unit environments. However, due to the motion of the conveyor elements, it has been difficult to devise an efficient feeder system to automatically charge such conveyors with the articles to be carried thereby. Star wheel feeders and various other conventional arrangements for charging conveyors have not proven satisfactory for this purpose.

Among the objects of the instant invention are the following: to provide a simple and efficient feeder system for conveyors, and particularly for conveyors of the compound-motion rail-type; to provide a feeder system adapted to charge a rail-type conveyor with articles, such as cans, with no attendant damage to the articles; and to provide a feeder system adapted to charge a conveyor in such manner that the density of charge will be substantially the same throughout the width of the conveyor.

Broadly, the embodiment of the invention comprises a continuous belt arranged transversely of the feed end of a rail-type conveyor and immediately adjacent thereto, a guard rail above the outer edge of the belt provided with a curved end portion adapted to deflect cans off of the belt and onto the ends of the fixed rails of the conveyor, and bevelled surfaces for the upper edges of the movable rails at the ends of these rails. As cans are carried along the belt, the lead cans are deflected onto the fixed rails, and this deflection action together with the rate of travel of the belt causes a crowding together of the cans on the belt to bring them into engagement with each other and with the guard rail in misaligned relation. The resultant interaction between the cans forces them off of the belt and onto the fixed rails where they are picked up by the bevelled surfaces of the movable rails and carried forwardly on the conveyor.

Other objects and advantages of the invention will be apparent from the following description taken in conjunction with the drawing forming part of this specification, and in which:

Figure 1 is a plan view of the conveyor feeder system embodied in the invention, showing an arrangement of cans thereon at the beginning of the operation of the feeder;

Figure 2 is a plan view similar to that of Figure 1, showing an arrangement of cans during the operation of the feeder system;

Figure 3 is a detail view in sectional elevation, as might be taken along lines 3—3 of Figure 1, showing the movable rails of the conveyor in their highest position, and indicating the sequence of movement of a can from the feeder belt to the fixed rails of the conveyor, and from thence to the movable rails; and Figure 4 is a detail view similar to Figure 3, but showing the movable rails of the conveyor in their lowest position of operation.

Referring to the drawing for further details of the invention, 10 indicates generally the feed-end portion of a rail-type conveyor comprised of fixed rails 12, having ends 14 and upper edges 16, spaced apart and alternately arranged with movable rails 18, having ends 20 and upper edges 22, said rail-type conveyor being similar in operation to that shown and described in our copending application, Serial No. 46,666, wherein claims are made to a system for actuating the movable rails in relation to the fixed rails. For the purpose of describing the instant invention, it will be sufficient to point out that the movable rails 18 are caused to move with a compound motion in a cyclic path, beginning the cycle, for example, with their ends 20 in alignment with the ends 14 of the fixed rails 12, and with their upper edges 22 below the upper edges 16 of the fixed rails, as indicated in Figure 4 of the drawing. As the cyclic movement of the rails 18 proceeds, the rails move upwardly and to the right as viewed in the drawing, to bring the upper edges 22 above the upper edges 16 of the fixed rails, lifting objects resting on the fixed rails and carrying them to the right a predetermined distance. The rails 18 then move downwardly to deposit the objects on the fixed rails, and then move further downwardly and to the left to bring the ends 20 into alignment with the ends 14 of the fixed rails and the upper edges 22 below the upper edges 16 of the fixed rails, or to the starting position of Figure 4. Continued cyclic operation of the movable rails in this manner is effective to move objects along the conveyor to the discharge end thereof.

In conjunction with a conveyor of the compound-motion rail-type, we have provided a feeder system comprised of a closed path conveyor belt 24 passing over a driving spindle 26 journalled for rotation in a member 28 carried by a frame 30 supporting the fixed rails 12. The spindle 26 is provided with a sprocket 32 in engagement with a chain drive 34 connected to suitable driving means, not shown. The other end of the belt 24 passes over a suitable idler spindle, also not shown. It will be noted that the upper reach 36 of the belt 24 is in alignment with the upper edges 16 of the fixed rails and that the belt is immediately adjacent the ends 14 of said rails, so as to leave no appreciable space therebetween. A guard rail 38 in substantial alignment with the outer edge of the belt 24 is provided with an inwardly curved portion 40 secured to the frame 30, and another guard rail 42 extending from the feed end of the belt 24 to the frame 30 cooperates with the rail 38 in maintaining objects on the belt. To complete the feeder system, the upper edges 22 of the movable rails 18 are provided with bevelled surfaces 44 adjacent the ends 20 of said rails.

For the sake of describing the operation of the feeder system, it will be assumed that the belt 24 extends between the rail-type conveyor 10 and packing or canning tables where food is placed within cans 46, and that the conveyor 10 passes through an exhaust box wherein the contents of the cans are cooked. When the belt 24 is in operation, cans 46 are placed on the upper reach thereof and transported to the conveyor 10. The cans may be placed on the belt in orderly spaced fashion, as shown in Figure 1, or they may be placed thereon in misaligned abutting relation. In either case the lead can is diverted by the curved portion 40 of rail 38 onto the fixed rails 12, and the reaction of such diversion combined with the speed of travel of the belt 24, which is sufficient to bring a greater number of cans to the mouth of the conveyor 10 in a given period of time than can be discharged by the conveyor 10 within the same period of time, causes a resultant crowding together, or packing, of the cans against each other and the rail 38, as shown in Figure 2.

This packing action results in cans being continuously forced off of the belt and onto the fixed rails 12 to the dotted outline position of Figure 3. From this initial position on the fixed rails, the cans are moved outwardly by the action of succeeding cans until they come within the path of movement of the bevelled surfaces 44 of the movable rails 18, whereupon the upward and forward movement of the rails 18 causes the cans to be picked up by the bevelled surfaces 44, as indicated by the can in solid outline of Figure 3, to be moved forward by said rails. When the movable rails return to the starting position of Figure 4, other cans will have been forced into position meanwhile for lifting by the bevelled surfaces 44 during the next cycle of movement of the rails.

The bevelled surfaces 44 are preferably equal to or greater in length than the diameter of the base of a can, so that the can will be evenly supported during the lifting operation, and the angle of inclination of said bevelled surfaces with respect to the horizontal edges 22 of the movable rails should be such that the cans will be in stable equilibrium when carried on said surfaces.

While the initial crowding or packing action of the cans takes place adjacent the curved portion 40 of the guard rail, it will be understood that almost immediately thereafter this action will spread across the mouth of the conveyor 10, and that the cans will then pass onto all of the rails 12 in substantially uniform manner. It is thus possible to obtain a solid formation of cans on the conveyor 10, and to do so without causing the overturning of any of the cans with possible resultant damage thereto. By varying the longitudinal throw of the movable rails 18, as by the use of the arrangement shown in our co-pending application hereinabove referred to, it is possible to control the spacing between successive groups of cans as the cans are deposited on the fixed rails 12 from the bevelled surfaces 44, if variable spacing be in fact desired.

While the preferred embodiment of the invention has been shown and described, it will be understood that this embodiment is subject to modification within the spirit of the invention and the scope of the appended claims.

What we claim as new and desire to secure by Letters Patent is:

1. For a conveyor having fixed rails and movable rails alternately arranged with repect to said fixed rails, wherein said movable rails are adapted to move in a cyclic path above and forwardly and below and rearwardly of the fixed rails; a feeder system comprising movable support means arranged transversely of the conveyor and adjacent the feed end thereof, guide means associated with said support means to prevent articles freely carried by the latter from being accidentally displaced therefrom, said guide means including means for deflecting articles onto said conveyor, means operably connected to said support means to drive the same at a sufficient speed to maintain a number of articles adjacent the feed end of the conveyor in excess of the receiving capacity of said conveyor for said articles, and bevelled surfaces forming a portion of the upper edges of the movable rails of the conveyor at the feed end thereof.

2. For a conveyor having fixed rails and movable rails alternately arranged with respect to said fixed rails, wherein said movable rails are adapted to move in a cyclic path above and forwardly and below and rearwardly of the fixed rails; a feeder system comprising a belt arranged transversely of the feed end of said conveyor and immediately adjacent thereto, a guard rail for said belt, a deflector member extending across the belt, and bevelled surfaces forming a portion of the upper edges of the movable rails of the conveyor at the feed end thereof.

3. For a conveyor having fixed rails and movable rails alternately arranged with respect to said fixed rails, wherein said movable rails are adapted to move in a cyclic path above and forwardly and below and rearwardly of the fixed rails; a feeder system comprising a belt arranged transversely of the feed end of said conveyor, said belt being immediately adjacent said feed end and level therewith, a guard rail for said belt, a curved deflector member extending across the belt, and bevelled surfaces formed on the upper edges of the movable rails at the feed end of the conveyor, said bevelled surfaces being inclined downwardly and toward said belt.

4. For a conveyor having fixed rails and movable rails alternately arranged with respect to said fixed rails, wherein said movable rails are adapted to move in a cyclic path above and forwardly and below and rearwardly of the fixed rails; a feeder system for moving cans, or the like, from a source of supply to the feed end of said conveyor, said system comprising a belt arranged transversely of the feed end of said conveyor and immediately adjacent thereto, said belt extending to said source of supply and having the portion adjacent to the feed end of the conveyor horizontally disposed and at the level of said feed end, a guard rail for the inside edge of said belt and extending between said source of supply and the side of said conveyor adjacent said source, a guard rail for the outside edge of said belt extending from said source to the side of said conveyor farthest removed from said source and terminating in a curved deflector crossing over said belt, a plurality of cans on said belt, means connected to said belt to drive the same at a predetermined speed to maintain a number of cans adjacent the feed end of the conveyor in excess of the receiving capacity of said conveyor for said cans, and bevelled surfaces formed on the upper edges of the movable rails at the feed end of the conveyor, said bevelled surfaces being inclined downwardly and toward said belt.

STANLEY MARVIN.
WILLIAM H. ORTH.

REFERENCES CITED

The following references are of record in the file of this patent:

UNITED STATES PATENTS

| Number | Name | Date |
|---|---|---|
| 816,323 | Hellstrom | Mar. 27, 1906 |
| 1,427,325 | Quick | Aug. 29, 1922 |